United States Patent [19]

Andrisin, III

[11] Patent Number: 5,237,721
[45] Date of Patent: Aug. 24, 1993

[54] SWIVEL CASTER ASSEMBLY

[75] Inventor: John J. Andrisin, III, Seven Hills, Ohio

[73] Assignee: Century Products Company, Macedonia, Ohio

[21] Appl. No.: 909,278

[22] Filed: Jul. 6, 1992

[51] Int. Cl.⁵ .............................................. B06B 33/00
[52] U.S. Cl. ....................................... 16/20; 16/27; 16/29
[58] Field of Search ................. 16/20, 27, 29, 31 R, 16/31 A, 47, 48

[56] References Cited

U.S. PATENT DOCUMENTS 4,897,895 2/1990 Wang ...................................... 16/20

Primary Examiner—W. Donald Bray
Attorney, Agent, or Firm—Graham & James

[57] ABSTRACT

An improved caster assembly is provided having a load-bearing bushing rotationally disposed in a caster body and including at least one grooved recess about its perimeter wall. As the bushing rotates relative to the caster body, the grooved recess acts to dislodge dirt and particulate matter disposed between the outer surface of the perimeter wall of the bushing and the inner surface of the bore in the caster body. Rotation dislodges the particulate matter where gravity causes it to fall downwardly away from the bushing where it is displaced from the caster assembly through an open end of the caster body or suitable debris outlet.

11 Claims, 2 Drawing Sheets

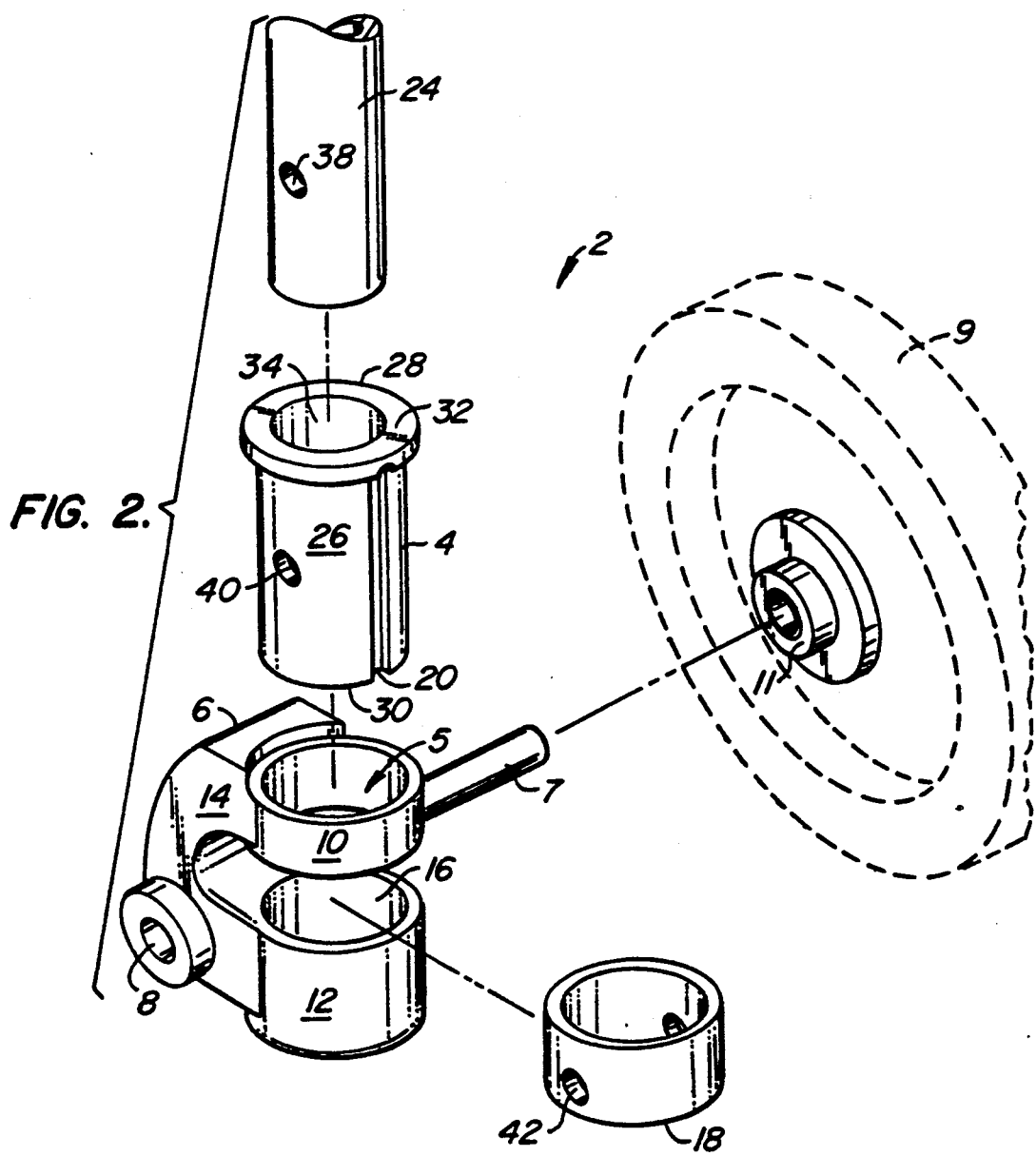

SWIVEL CASTER ASSEMBLY

BACKGROUND OF THE INVENTION

The invention generally relates to caster wheel assemblies, and more particularly to an improved caster swivel assembly for rotationally mounting a support wheel to a frame of baby furniture such as a stroller and the like.

Baby furniture, particularly infant strollers, use caster wheel assemblies to provide directional maneuverability. A caster swivel connection for the wheels at the front of the stroller provides improved maneuverability and directional control for the user. In some cases, casters are used at each leg of the stroller. Due to the relatively light loads imparted on infant strollers, it is common to employ caster assemblies which use rotational bushings rather than bearing assemblies to reduce cost and weight while still providing smooth rotational movement. Conventionally, singular wheel or tandem wheel assembly is supported by an axle and retained by a swivel housing. A leg of the stroller frame is rotationally connected to a bushing which is rotationally disposed in the swivel housing. Various constructions are used to retain the bushing the housing. For example, U.S. Pat. No. 4,897,895 teaches the use of a detent on a bushing to retain the bushing in the caster housing while allowing rotational movement.

A problem common to all bushing and caster housing constructions is the penetration of dirt and other particulate matter which can build up and retard free rotational movement between the bushing and the housing causing excessive wear due to friction and abrasion. Because the bushing and caster housing are adjacent the support wheels, dirt and dust can accumulate on the bushing surfaces to the point of rotational binding or seizure. Because relatively close dimensional tolerances are necessary to eliminate play between the bushing and housing, even small amounts of dirt or particulate matter can be a problem. Conventional caster bushing constructions require disassembling and cleaning to retard excessive wear and prolong operational life. This type of maintenance is not practical.

It is desirable, therefore, to provide a simple swivel caster construction which is inexpensive, light weight, easy to manufacture and provides a self-cleaning feature which can help reduce and remove dirt and particulate matter gathered between bushing and swivel portions and thereby increase product durability and operational life.

SUMMARY OF THE INVENTION

In accordance with the invention, an improved swivel caster assembly is provided having a caster body with a socket, the socket forming a generally cylindrical hollow bore along a longitudinal axis. An axle sleeve is provided in the body generally transverse to the longitudinal axis of the body. A bushing is rotationally disposed in the socket and restricted in movement along the longitudinal axis of the socket bore while allowing free rotational movement between the bushing and the caster body. When the bushing is coupled to a leg of the object being supported and support wheels are mounted on the caster body, the caster body and the supporting wheels are allowed to axially rotate above the longitudinal axis. The bushing is constructed having at least one substantially linear grooved recess on the outside perimeter wall of the bushing. As relative rotational movement occurs between the bushing and the caster body, dirt and other particulate matter between the bushing and the inside surface of the socket bore is scraped away and captured in the grooved recess. With the aid of gravity, the dirt or other particulate matter is channeled downwardly and away from the interface between the outer surface of the bushing and the inner wall surface of the socket in the caster body. This construction provides a self-cleaning feature whereby particulate matter is dislodged and displaced from between the critical rotating surfaces.

In the preferred embodiment of the invention, the caster body includes a pair of axial spaced-apart sockets which together define the bore for receiving the bushing. A ring-shaped sleeve is disposed between the spaced-apart sockets and is secured to the bushing mounted in the bore. The spaced-apart sockets act as stop surfaces limiting longitudinal movement of the ring-shaped sleeve and thereby restricting longitudinal movement of the bushing. The top end of the bushing also preferably includes an outwardly extending flange which abuts the upper socket further limiting longitudinal movement of the bushing and displacing the load communicated from the leg.

In the preferred embodiment of the invention, the bore has one closed end provided by an end wall on the lower socket and includes a debris outlet allowing dirt and particulate matter to fall out and away from the caster assembly after being channeled downwardly by the grooved recess. The end wall includes an upwardly extending protrusion which mates with a central aperture in the bottom of the bushing to further provide rotational alignment between the bushing and the longitudinal axis of the sockets.

The self-cleaning feature provided by the grooved recess channeling away dirt and particulate matter from the interfacing rotational surfaces enhances operational life and significantly reduces maintenance. Relatively large particulate matter such as sand typically ruined conventional bushing caster assemblies. The inventive assembly easily discharges sand, dirt or dust and provides increased ventilation to minimize moisture damage. The caster assembly can be made with light weight, durable and low cost components and is easy to manufacture due to the simplicity of construction. These and many other features and advantages of the invention will become apparent from the following detailed description in conjunction with the drawing appended hereto.

BRIEF DESCRIPTION OF THE DRAWINGS

FIG. 1 is a perspective view of the preferred embodiment of the invention shown in the assembled condition;

FIG. 2 is an exploded view of the device shown in FIG. 1 with a support wheel shown in broken lines;

DETAILED DESCRIPTION OF THE PREFERRED EMBODIMENTS

Figure 3:
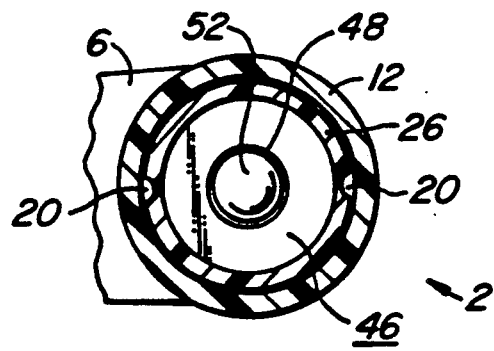
FIG. 3 is a cross-sectional view along lines 3—3 of the device shown in FIG. 1.

The preferred embodiment of the invention is illustrated in perspective view in the fully assembled condition in FIG. 1. Generally, caster assembly 2 includes bushing 4 rotationally disposed in a longitudinal bore 5 of body 6. In the preferred embodiment, body 6 includes axle sleeve 8 configured to retain an axle 7 for a support wheel 9 or tandem wheel assembly. Sleeve 8 is preferably constructed to provide lateral support for hub 11 on wheel 9. The longitudinal bore of body 6 is defined by a pair of axially spaced sockets 10, 12. Alternatively, bore 5 can be defined by a single socket or more than two sockets.

Sockets 10, 12 are generally tubular-shaped and made integral with body 6. Body 6 couples sockets 10, 12 to axle sleeve 8 extending transverse to and offset from the longitudinal axis of sockets 10, 12. Bracket 14 is preferably hollow to reduce weight and is substantially "C"-shaped defining a cavity 16 between sockets 10, 12. Bracket 14 and sockets 10, 12 are preferably integral. Ring-shaped sleeve 18 is disposed between sockets 10, 12 in cavity 16 and limited in longitudinal movement thereby.

Bushing 4 is rotationally disposed in the longitudinal bore of body 6 defined by sockets 10, 12. Bushing 4 includes at least one grooved recess 20 more fully described below. Bushing 4 also includes inner receptacle 22 configured to receive leg 24 of a baby stroller, baby furniture or the like. As best seen in FIG. 2, bushing 4 is generally tubular in shape and includes perimeter wall 26, top end 28 and bottom end 30. Top end 28 includes an outwardly extending flange 32 preferably configured to form a perimeter collar or rim at top end 28. At least one grooved recess 20 is provided on perimeter wall 26. In the preferred embodiment, two opposing grooved recesses 20 are provided 180 degrees apart on perimeter wall 26 as best seen in FIG. 3. Bushing 4 includes hollow 34 sized to receive leg 24.

Bushing 4 is rotatably disposed in the bore created by sockets 10, 12 and sized to minimize play therein while allowing full rotational movement along the longitudinal axis of the bore in body 6. Ring-shaped sleeve 36 is disposed about bushing 4 in cavity 16 and is preferably sized having an inner diameter and outer diameter substantially equivalent to that of sockets 10, 12. Leg 24 includes opposed holes 38 providing a transverse bore thereto. Likewise, bushing 4 also includes holes 40 and ring-shaped sleeve 36 has similarly shaped and sized holes 42. In assembly, holes 38, 40 and 42 are aligned to provide a transverse through-bore adapted to receive a fastener such as a rivet 36, bolt or suitable alternative to rotationally secure leg 24 to bushing 4 and ring-shaped sleeve 36. Thus, when assembled, leg 24, bushing 4 and ring-shaped sleeve 36 rotate in unison relative to body 6. It is preferred that caster assembly 2 be fabricated from suitable plastic material. Alternatively, however, metals, ceramics or other materials could be used.

One of the primary features of the invention is the provision of grooved recess 20 on perimeter wall 26 of bushing 4. In conventional bushing and sleeve constructions, dirt, moisture and particulate matter can foul and inhibit the rotational movement between the bushing and related sleeve. In extreme cases, accumulated dirt or other particulate matter can cause the device to bind or seize altogether restricting or preventing rotational movement. Grooved recess 20 on bushing 4 provides a self-cleaning function in caster assembly 2. This function is best explained in conjunction with FIGS. 3 and 4.

Figure 4:
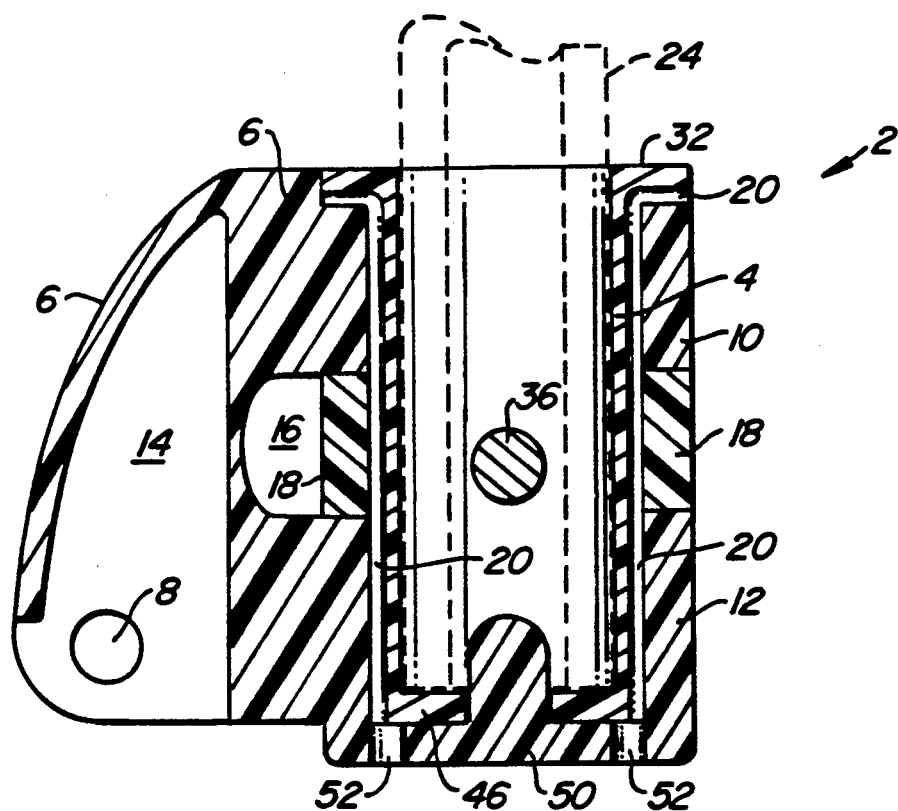
FIG. 4 is a cross-sectional view along lines 4—4 of the device shown in FIG. 1.

Referring to FIGS. 3 and 4, grooved recess 20 is provided on perimeter wall 26 of bushing 4 facing towards the inner surface of sockets 10, 12 and ring-shaped sleeve 18. Preferably, two opposed grooved recesses 20 are provided as illustrated in the drawing. However, as few as one or more than two could be employed. In the embodiment illustrated, grooved recess 20 is fabricated having a generally semi-circular cross-section with a depth approximately equal to one-half of the thickness of perimeter wall 26. Grooved recess 20 extends from bottom end 30 to top end 28 of bushing 4 and across the bottom edge of flange 32. As bushing 4 and sockets 10, 12 rotate relative to each other, grooved recess 20 passes across the inner wall of the bore formed by sockets 10, 12.

In the preferred embodiment, the edges 44 of grooved recess 20 are relatively sharp to help scrape away and dislodge particulate matter from the inner wall of sockets 10, 12. The entire inner surface of the sockets 10, 12 can therefore be scraped upon 180 degree relative revolution between bushing 4 and body 6. When more than two grooved recesses 20 are used, this rotational angle is decreased. Grooved recesses 20 are preferably linear and vertical parallel to the longitudinal axis of the bore. As such, particulate matter dislodged during revolution falls by gravity and is channeled downwardly through grooved recess 20 to the bottom of bushing 4. Although linear vertical grooved recesses are preferred, non-linear grooved recesses could be used providing they extend to bottom end 30.

As shown in FIG. 4, in the preferred embodiment of the invention bushing 4 extends into the bore of body 6 formed by sockets 10, 12 and includes bottom 46 at bottom end 30 having central aperture 48 therein. Socket 12 preferably includes end wall 50 with one or more debris outlets 52 positioned below grooved recesses 20. As particulate matter and dirt is dislodged and channeled downwardly through grooved recess 20, it falls away from caster assembly 2 through debris outlets 52. Additionally, debris outlets 52 and grooved recesses 20 provide enhanced ventilation to reduce trapped moisture. End wall 50 preferably includes an upwardly extending protrusion 52 which extends through central aperture 48 of bushing 4. Protrusion 52 and central aperture 48 help further to align and retain bushing 4 along the longitudinal axis of the bore in body 6 thus adding structural integrity. Alternatively, end wall 50 can be made flat, if desired, or eliminated all together. In such a case, bottom 46 can be eliminated from bushing 4.

The foregoing description of the preferred embodiment of the invention has been presented for purposes of illustration and description. It is not intended to be exhaustive with respect to possible alternative embodiments or to limit the invention to the precise form disclosed. Many modifications and variations are possible in light of the above teaching without deviation from the spirit and scope of the invention. For example, grooved recess 20 can be other than linear as discussed. Likewise, cross-sections other than semi-circular can be used for grooved recess 20 such as rectangular, V-shaped, etc. Further, socket 12 provides a substantially closed end in the bore of body 6 by providing end wall 50 at the bottom of socket 12 as illustrated. This construction provides enhanced protection from contaminates and in aesthetically pleasing. As previously described, socket 12 can be made completely open-ended on both ends thus removing completely end wall 50 and protrusion 52. Axial movement of bushing 4 would still be limited by the travel available to ring-shaped sleeve 18 within cavity 16 since ring-shaped sleeve 18 is secured to bushing 4. Likewise, vertical loads placed on bushing 4 by leg 24 is dissipated by flange 32 and the connection with ring-shaped sleeve in most circumstances. End wall 50 could also be made spoked or cross-hatched as desired.

Axial sleeve 8 can be positioned other than as illustrated in the drawing if suitable to the particular use contemplated. Additionally, bushing 4 could be retained in the bore of body 6 using means other than those shown and described. The embodiments described in this description were selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A caster assembly, comprising:
   a body having a first socket defining a generally cylindrical hollow bore having an inner wall of a first diameter and a longitudinal axis;
   means for coupling an axle to the body generally transverse to the longitudinal axis of the bore and configured to retain an axle of a support wheel;
   a bushing rotatably disposed in said bore, the bushing having a first end, a second end and generally cylindrical perimeter wall therebetween, the wall having an outer surface and an outer diameter less than the inner diameter of the bore;
   at least one substantially linear grooved recess extending across the outer surface of the perimeter wall between the first and second ends and configured to capture and channel away particulate matter from between the inner wall of the bore and the outer surface of the perimeter wall;
   means for restricting movement of the bushing along the longitudinal axis of the bore; and
   means for rotationally coupling the bushing to a leg wherein the caster assembly facilitates rotational movement of the body relative to the leg about the longitudinal axis.

2. The caster assembly of claim 1 further comprising:
   a second socket axially spaced apart from the first socket along said longitudinal axis, the first and second sockets substantially defining said bore;
   a generally ring-shaped sleeve disposed between the first and second sockets; and
   means for rotationally interlocking the ring-shaped sleeve to the bushing.

3. The caster assembly of claim 2 further wherein the restricting means includes and outer surface of the first socket and an outer surface of the second socket limiting motion of the ring-shaped sleeve along the longitudinal axis and thereby limiting movement of the bushing along the longitudinal axis.

4. The caster assembly of claim 3 wherein the bushing includes a flange extending outwardly from the first end and slidably engaged with an outer surface of the first socket wherein said engagement limits travel of the bushing in the bore along the longitudinal axis in the direction towards the second socket.

5. The caster assembly of claim 4 wherein the second socket includes an end wall, the end wall having a debris outlet whereby the particulate matter can exit the bore through the debris outlet.

6. The caster assembly of claim 1 wherein the bore is open at one end and closed at an opposite end by an end wall, the end wall including a debris outlet whereby particulate matter can exit the bore through the debris outlet.

7. The caster assembly of claim 5 or 6 wherein the end wall includes a protrusion extending into the bore from the end wall and the bushing includes an aperture configured to receive the protrusion and align the bushing along the longitudinal axis of the bore.

8. The caster assembly of claim 1 wherein the bushing is generally tubular forming an inner receptacle configured to receive the leg.

9. The caster assembly of claim 5 wherein the bushing includes two opposed holes in the perimeter wall, the ring-shaped sleeve further comprising two opposed holes and the leg including a transverse bore, wherein the transverse bore and the holes of the sleeve and the holes of the bushing can be rotatably aligned to receive a fastener therethrough, the fastener rotationally securing the sleeve to the bushing and the bushing to the bore.

10. A caster assembly for rotationally mounting a support wheel to a leg, the support wheel having an axle, the caster assembly comprising:
    a body having an axle sleeve for receiving said axle, a first socket axially spaced apart from a second socket along a longitudinal axis, the first and second sockets substantially defining a bore having an inner wall of a first diameter and an end wall, the end wall having a debris outlet;
    a bushing rotatably disposed in said bore, the bushing having a first end, a second end and generally cylindrical perimeter wall therebetween, the first end including an outwardly extending perimeter collar slidably engaged with an outer surface of the first socket, the perimeter wall having an outer diameter less than the first diameter and including at least one substantially linear grooved recess extending between the first and second ends configured to capture and channel particulate matter from between the inner wall of the bore and the perimeter wall of the bushing towards the end wall of the bore;
    a generally ring-shaped sleeve disposed between the first and second sockets and rotationally coupled to the bushing; and
    means for rotationally securing the ring-shaped sleeve and the bushing to the leg thereby allowing rotational movement of the axle sleeve relative to the leg about the longitudinal axis of the bore.

11. The caster assembly of claim 10 wherein the end wall includes a protrusion extending into the bore from the end wall and the bushing includes an aperture configured to receive the protrusion and align the bushing along the longitudinal axis of the bore.

* * * * *